Figure 1:
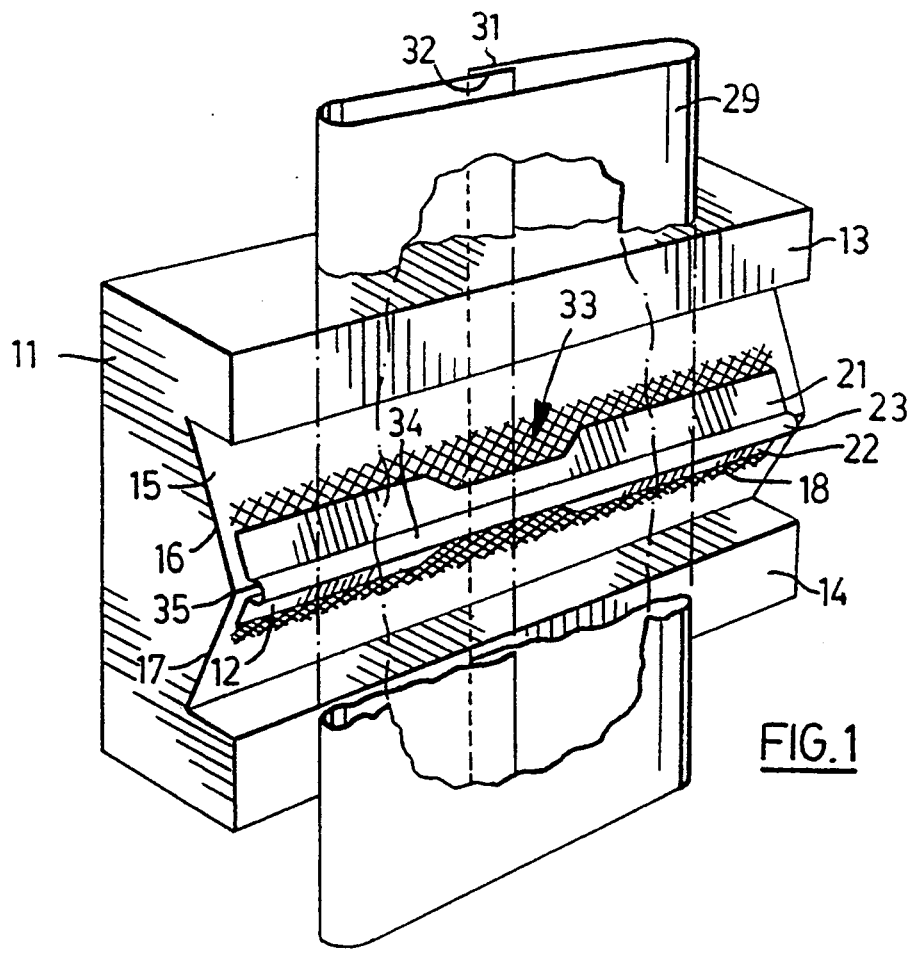

United States Patent
Perrett

[11] Patent Number: 5,355,656
[45] Date of Patent: Oct. 18, 1994

[54] HEAT SEALING ELEMENT FOR PACKAGING MACHINES WHICH MAKE LAP-SEALED POUCHES

[75] Inventor: Arnold E. Perrett, Whitby, Canada

[73] Assignee: Du Pont Canada Inc., Mississauga, Canada

[21] Appl. No.: 45,294

[22] Filed: Apr. 13, 1993

[51] Int. Cl.⁵ .............................................. B65B 51/00
[52] U.S. Cl. .................... 53/373.7; 156/251; 156/515
[58] Field of Search ............... 156/251, 515; 53/373.7

[56] References Cited

U.S. PATENT DOCUMENTS

| | | | |
|---|---|---|---|
| 3,162,564 | 12/1964 | Buchner | 53/373.7 |
| 3,409,494 | 11/1968 | Korzinek | 156/515 |
| 3,692,613 | 9/1972 | Pederson | 156/498 |
| 3,982,991 | 9/1976 | Hamm et al. | 156/515 |
| 4,115,182 | 9/1978 | Wildmoser | 156/515 |
| 4,774,845 | 5/1988 | Posey | 156/258 |
| 5,056,295 | 10/1991 | Williams | 53/373.7 |

FOREIGN PATENT DOCUMENTS

| | | | |
|---|---|---|---|
| 2145593 | 2/1973 | France | B29C 27/00 |
| 2414393 | 8/1979 | France | B29C 27/06 |
| 1164368 | 9/1969 | United Kingdom | B29C 27/02 |

Primary Examiner—W. Donald Bray
Attorney, Agent, or Firm—Konrad S. Kaeding

[57] ABSTRACT

A heat sealing element, for sealing and simultaneously cutting through at least two layers of thermoplastic film is disclosed. It is particularly adapted for use with a vertical form, fill and seal machine for packaging flowable materials, e.g. chocolate fudge sundae topping, in a lap seamed pouch. The heat sealing element has a portion, which has a greater electrical resistance than the remainder of the element, at the position where the lap seal is to be formed. The portion which has a greater electrical resistance is preferably a portion which is narrower than the remainder of the element, preferably 83 to 94% of the width of the remainder of the element.

9 Claims, 1 Drawing Sheet

HEAT SEALING ELEMENT FOR PACKAGING MACHINES WHICH MAKE LAP-SEALED POUCHES

The invention relates to a heat sealing element useful for making lap-sealed pouches filled with flowable materials, e.g. thick sauces and dressings, particularly to pouches made on so-called vertical form, fill and seal machines.

It is well known to package flowable materials, for example milk, mayonnaise and the like on so-called vertical form, fill and seal machines. Using one such a machine, a flat web of thermoplastic film is unwound from a roll and formed into a continuous tube in a tube forming section, by sealing the longitudinal edges of the film together to form a so-called lap seal or a so-called fin seal. The tube thus formed is pulled vertically downwards to a filling station. The tube is then collapsed across a transverse cross-section of the tube, the position of the cross-section being at a sealing device below the filling station. A transverse heat seal is made, by the sealing device, at the collapsed portion of the tube, thus making an airtight seal across the tube. The sealing device generally comprises a pair of jaws. After making the transverse seal, but before the jaws of the sealing device are opened, a quantity of material to be packaged, e.g. liquid, is caused to enter the tube, at the filling station, and fill the tube upwardly from the aforementioned transverse seal. The tube is then caused to move downwardly a predetermined distance. Such movement may be under the influence of the weight of the material in the tube, or may be caused by pulling or mechanically driving the tube. The jaws of the sealing device are closed again, thus collapsing the tube at a second transverse section. The second transverse section may be above, usually just above, the air/material interface in the tube, or the second transverse section may be below the air/material interface. The sealing device clamps, seals and severs the tube transversely at the second transverse section. The material-filled portion of the tube is now in the form of a pillow shaped pouch. Thus the sealing device has sealed the top of the filled pouch, sealed the bottom of the next-to-be formed pouch, all in one operation. One such vertical form and fill machine of the type described above is sold under the trade mark PREPAC. Other machines may be operated such that the material-to-be-packaged is caused to enter the tube continuously rather than intermittently as described above. As a result, sealing of the film takes place with material-to-be-packaged between the heat sealing surfaces in the tube.

With some other machines, the sealing device does not sever the tube at the second transverse section, but does sever the tube subsequently. With yet other machines the jaws of the heat sealing device reciprocate up and down. With such machines, the jaws clamp, seal and sever the tube of film while moving in a downward direction, the jaws then open and return upwards in the open position. The downward movement of the closed jaws also serve to advance the tubular film downwardly.

For many years, milk has been packaged in pouches made on vertical form and fill machines. Such pouches have been sold to household consumers and, in use, such milk-filled pouches are stood within an open-mouthed pitcher. More recently, such pouches have been used to package other flowable comestibles, mayonnaise, caramel, scrambled eggs, tomato ketchup, chocolate fudge, salad dressings, preserves and the like. Pouches containing such comestibles are usually sold to "institutional" buyers, e.g. restaurants.

The present invention relates to heat sealing machines in which the sealing and severing occurs in a single operation and the pouches formed by the machine have lap seals.

A sealing device commonly used is a so-called "impulse sealer" in which an electrical current flows through the sealing element for only a fraction of the cycle time between operations. The impulse sealer may be a round wire, e.g. a "piano" wire about 2.0 mm to 2.3 mm diameter, electrically insulated from a water-cooled supporting jaw. After the electrical impulse is fed to the impulse sealer, there is a cooling period in which the seals are "set". Round wire impulse sealers as described above, in combination with conventional flat faced heat sealing jaws, are satisfactory for form and fill machines when packaging liquids such as milk, water or other highly aqueous products. These liquids have relatively high thermal conductivities and thus aid in cooling of the seal after the sealing jaws are opened, i.e. the cooling effect of the liquid on the seal operates before the weight of the liquid can weaken or rupture the bottom seal. Round wire impulse sealers are generally unsatisfactory on form, fill and seal machines when packaging thick flowable materials such as mayonnaise, chocolate fudge, scrambled egg mix, dressings, jams and the like.

Other kinds of sealers are known, e.g. as disclosed in U.S. Pat. No. 3,692,613, which issued Sep. 19, 1972 to R. E. Pederson, in U.S. Pat. No. 4,115,182, which issued Sep. 19, 1978 to M. M. Wildmoser and U.S. Pat. No. 4,744,845, which issued May 17, 1988 to J. Posey.

Heretofore, however, arrangements of heat sealing elements and heat sealing jaws have not been entirely satisfactory for sealing through thick flowable materials, especially at the portion of the pouch where an extra layer of film is present, i.e. at a lap seal.

Accordingly, the present invention provides a metal heat sealing element for transversely sealing and simultaneously cutting through a flattened longitudinal tube formed from a longitudinally folded film, in which the longitudinal edges of the film overlap, said element comprising a long strip having a width greater than its thickness, said strip having a portion for sealing and simultaneously cutting through the flattened tube, said strip also having a portion which is located along the length of the strip such that the portion coincides with the overlapped edges, said portion having a greater electrical resistance than the remainder of the element.

In one embodiment the portion having greater electrical resistance is narrower in width than the remainder of the element.

In a further embodiment the portion having greater electrical resistance is thinner than the remainder of the element.

In yet another embodiment portions of the heat sealing element, adjacent the portion having greater electrical resistance, are plated or spray coated with a metal having lower electrical resistance than the metal from which the element is made.

In one embodiment, where the portion having greater electrical resistance is narrower in width than the remainder of the element, the narrow portion is from 80 to 97% of the width of the remainder of the element.

In one embodiment the narrow portion of the element is from 83 to 94% of the width of the remainder of the element.

In another embodiment the heat sealing element is made from a flat strip of metal upon which is welded a round wire.

In yet another embodiment the heat sealing element is made from a flat strip of metal, bent so that the heat sealing element comprises two flat elongated fins adjoined by a segment of a tube, each lateral edge of said segment being adjoined to a lateral edge of one of the elongated fins.

In a further embodiment the planes of said fins meet at an angle of from 170 to 145 degrees.

In another embodiment the heat sealing element is made from a single piece of metal having a thickness of from 0.13 to 0.6 mm.

In yet another embodiment the heat sealing element is made from a piece of metal which has longitudinal sides and edges, and has a central longitudinal rib along one of said sides, said rib having a "bell curve" shaped cross-section.

In another embodiment the heat sealing element is made from a single piece of metal having a thickness of from 0.13 to 0.6 mm and having a narrow portion from 83 to 94% of the width of the remainder of the element.

In yet another embodiment the length of the narrow portion is from 10 to 25 mm, especially 14 to 22 mm.

The invention also provides an apparatus for forming pouches from a longitudinally folded film, in which the longitudinal edges of the film overlap, transversely flattening said tube, and transversely sealing and simultaneously cutting through the flattened longitudinal tube, in which the apparatus includes a heat sealing element which comprises a long strip having a width greater than its thickness, said strip having a portion which is located along the length of the strip length such that the portion coincides with the overlapped edges, said portion having a greater electrical resistance than the remainder of the element.

In one embodiment the portion having greater electrical resistance is narrower in width than the remainder of the element.

In a further embodiment the portion having greater electrical resistance is thinner than the remainder of the element.

In yet another embodiment portions of the heat sealing element, adjacent the portion having greater electrical resistance, are plated or splay coated with a metal having lower electrical resistance than the metal from which the element is made.

In one embodiment, where the portion having greater electrical resistance is narrower in width than the remainder of the element, the narrow portion is from 80 to 97% of the width of the remainder of the element.

In one embodiment the narrow portion of the element is from 83 to 94% of the width of the remainder of the element.

In another embodiment the heat sealing element is made from a flat strip of metal upon which is welded a round wire.

In yet another embodiment the heat sealing element is made from a flat strip of metal, bent so that the heat sealing element comprises two flat elongated fins adjoined by a segment of a tube, each lateral edge of said segment being adjoined to a lateral edge of one of the elongated fins.

In a further embodiment the planes of said fins meet at an angle of from 170 to 145 degrees.

In another embodiment the heat sealing element is made from a single piece of metal having a thickness of from 0.13 to 0.6 mm.

In yet another embodiment the heat sealing element is made from a piece of metal which has longitudinal sides and edges, and has a central longitudinal rib along one of said sides, said rib having a "bell curve" shaped cross-section.

In another embodiment the heat sealing element is made from a single piece of metal having a thickness of from 0.13 to 0.6 mm and the narrow portion is from 83 to 94% of the width of the remainder of the element.

In yet another embodiment the length of the narrow portion is from 10 to 25 mm, especially 14 to 22 mm.

Figure 2:
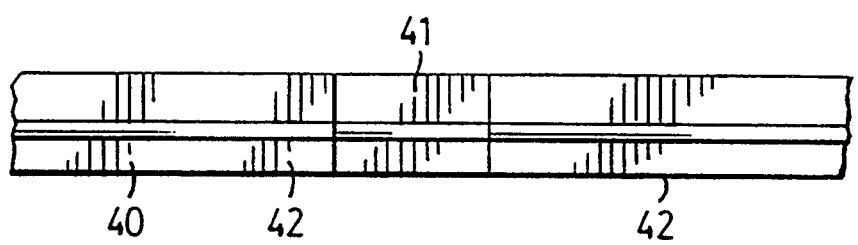

Embodiments of the invention are illustrated in the accompanying drawings in which:

FIG. 1 shows a three quarter view of a particularly preferred embodiment of the present invention; and FIG. 2 shows another embodiment.

FIG. 1 shows first heat sealing jaw 11 upon which is mounted a heat sealing element 12. The heat sealing assembly also has a cooperating second heat sealing jaw (not shown). Both jaws are mounted on a form and fill machine (not shown) as is known in the art. Both jaws may move reciprocally towards and away from each other. In the embodiment shown, between faces 13 and 14 of jaw 11 there is a longitudinal channel 15 which has a shallow W-shaped cross-section. The surfaces 16 and 17 of channel 15 may also be referred to herein as an element base. Placed on faces 13 and 14 of jaw 11 and channel 15 is at least one layer of woven glass fibre cloth 18 impregnated with polytetrafluoroethylene, which acts primarily as an electrical insulator and at least in part as a thermal insulator between the metal of the jaw and heat sealing element 12. Placed over layer 18 and over heat sealing element 12 is a further layer of woven glass fibre cloth (not shown) impregnated with polytetrafluoroethylene, which acts primarily to prevent sticking and burning of the thermoplastic film which, but for the cloth, would come into contact with heat sealing element 12. Heat sealing element 12 has a shape wherein two fins 21 and 22 are adjoined by an elongated arcuate segment. 23. The "peak" of arcuate segment 23 is shown at 34. The angle at which the planes of fins 21 and 22 intersect is from 180 to 140 degrees. It is preferred that the planes intersect at an angle of about 170 to 145 degrees. The cross-section of channel 15 substantially conforms to the angle of fins 21 and 22. Heat sealing element 12 is attached to an electrical impulse-providing apparatus (not shown). The second jaw has a longitudinal channel therein, in which is held a silicone rubber pad as is known in the art. The shape of jaw 11, and in particular faces 13 and 14, will determine in a large part the preferred shape of the silicone rubber. The apex 35 of longitudinal channel 15 and clamping faces 13 and 14 are adapted to ensure that the relative pressures at peak 34 and fins 21 and 22, when the jaws 11 and 12 are closed, are sufficient for the voiding, sealing and severing operation. A thermoplastic film tube 29 is passed between the jaws. The film tube is made from a longitudinally folded web of film and the longitudinal edges 31 and 32 are overlapped. The film tube 29 is collapsed transversely as the jaws are caused to approach one another. As the jaws close, the film tube is trapped between the glass fibre cloth which covers element 12 and the silicone rubber pad by the pressure exerted on the silicone rubber pad by heat sealing element 12 and faces 13 and 14. Heat sealing element 12 is connected at its ends to an electrical impulse generator. Neither the connections nor the electrical generator are shown. An electrical impulse is fed through heat sealing element 12. The electrical impulse, which heats the Heat sealing element 12 sufficiently for the heat to Simultaneously heat seal and sever the adjacent tubular film surfaces in a bead-like area as a result of contact with segment 23, and to strengthen the seals on both sides of the severed tube by means of the heat provided by fins 21 and 22. Although not wishing to be bound by any theory, part of the reason for this is thought to be that segment 23 is hotter than fins 21 and 22 because of the air gap which exists between segment 23 and the immediate area of apex 35 of surfaces 16 and 17 of channel 15. Heretofore, a difficulty encountered with prior art heat sealing elements was that the heat seal where the film overlap occurs was weaker than elsewhere along the heat seal. In the embodiment shown in FIG. 1 the heat seal element has a narrow portion 33. FIG. 1 is not to scale and the narrowed portion is, in practice, about as long as the width of the overlap of longitudinal edges 31 and 32. Because it is narrower than the remainder of the element, its resistance per centimeter of length is greater than the remainder of the element and it is heated at a faster rate and to a hotter temperature than the remainder of the element. Accordingly, the heat seal in the area of the overlap has a strength closer to the strength of the remainder of the seal. The electrical impulse is then switched off to allow the heat sealing element 12 and the sealed and severed tube to cool sufficiently to "set" the seals. Preferably the severed and sealed portions of the film tube are "set" more quickly by continuous water cooling of first jaw 11. Heat is thus transferred from the hot areas of the sealed film tube, through the metallic heat sealing element 12 to jaw 11. The jaws are then caused to move apart in order to release the film. The seals thus formed are the top seal of a sealed pouch and the bottom seal of the next-to-be-formed pouch. The purpose of cloth 18 is to provide electrical and thermal insulation between metal jaw 11 and heat sealing element 12. The glass fibre cloth which covers element 12 ensures that the film surfaces, during and after the sealing and severing process, do not adhere to any portion of the heat sealing device.

With respect to the heat sealing element 12 shown in FIG. 1 it will be noted that Segment 23 allows an air pocket to be present between cloth 18 and the portion of the element which causes severing of the film tube, i.e. portion 23. This air pocket enables a temperature gradient to occur such that the temperature of portion 23 is higher than the temperature of the fins 21 and 22, where much of the sealing occurs. This is desirable when sealing films which contain layers, e.g. nylon, which have melting temperatures higher than the melting temperature of the inner sealing layers, e.g. polyethylene. Ideally the temperature of portion 23 is at a temperature sufficient to sever the film tube while the fins 21 and 22 are at a temperature sufficient to seal the sealing layers. Additionally, as described above, a portion of element 12, at 33, has a greater electrical resistance to permit greater heating at this portion of the element and thus provide better sealing of the tube at the overlap portion.

FIG. 2 shows a portion of a heat sealing element 40 in which the width and thickness of the element is the same along its length. The portion 41 which is to contact the thermoplastic tube at the overlap of edges 31 and 32 is uncoated, whereas portions 42 are coated with a material, e.g. copper, which has a lower electrical resistance than the heat sealing element metal. When the element is heated, portion 41 is hotter than portions 42

Although not shown in the drawings the heat sealing element may simply be a ribbon bent in a V, such that the bend is arcuate and forms a simple transition from one fin to the other, i.e. does not have a tubular portion extending outwardly from the planes of the fins. In such a case, the air pocket desirable for development of the temperature gradient between the arcuate portion and the fins may be provided by milling out a longitudinal slot in apex 35.

Heat sealing elements may be made from ribbons of nickel-chromium alloys, pressed to shape with a press die or other processes known in the art.

The description of the invention, with reference to FIG. 1, is obviously directed to the embodiment wherein a central portion of the element is narrower than the remainder of the element in order to provide greater electrical resistance in the central portion. It will be understood that instead of narrowing the element, it can be thinned instead or thinned as well as narrowing, in order to obtain greater resistance at the portion along the heat sealing element which is going to be responsible for sealing the film tube at the overlapping film portion of the tube.

The invention is further illustrated by reference to the following example:

EXAMPLE 1

A heat sealing element was constructed from a metal having a width of 18 mm, a length of 310 mm and a thickness of about 0.4 mm. The central 210 mm was narrowed in width to about 4.8 mm and further narrowed, in the central 18 mm, to 4.44 mm. The outer portions, of 50 mm each were "spades" for electrical and mechanical connection purposes as is known in the art. The central 210 mm portion was the heat sealing element. The further narrowing in the 18 mm long portion was 92.5% of the width of the remainder of the heat sealing element. The heat sealing element was then bent so that the element comprised two fins, each having a length joined by an essentially semicircular segment of a tube having internal diameter of 0.5 mm. The planes of the fins were at an angle of about 150 degrees to one another. The heat sealing element fitted the jaw of a vertical form and fill machine which had been machined so that there was a longitudinal W-shaped channel therein, the apex of the W having an angle of 150 degrees so that the fins fitted snugly against the channel. The heat sealing element was mounted as in the drawing, with two woven glass fibre cloths impregnated with polytetrafluoroethylene. The second jaw of the form and fill machine had a longitudinal channel machined therein to accommodate a silicone rubber pad.

I claim:

1. A heat sealing element for sealing and simultaneously cutting through a tube of thermoplastic film defined by a plane having a longitudinal direction and a transverse direction perpendicular to the longitudinal direction, said tube having a lap seal formed by an overlap of edges of the film along the longitudinal direction, said element comprising a strip of metal having a width greater than its thickness and a length effective for simultaneously making a heat seal and cutting completely across the tube in the transverse direction, said strip having a portion of the length which coincides with the lap seal having a greater electrical resistance than all other portions of the element.

2. A heat sealing element according to claim 1 wherein the portion having the greater electrical resistance has a narrower width than all other portions of the element.

3. A heat sealing element according to claim 1 wherein the portion having the greater electrical resistance is thinner than all other portions of the element.

4. A heat sealing element according to claim 1 wherein portions of the heat sealing element, adjacent the portion having greater electrical resistance, are plated or spray coated with a metal having lower electrical resistance than the metal from which the element is made.

5. A heat sealing element according to claim 2 wherein the narrower width is from 83 to 94% of the width of all other portions of the element.

6. A heat sealing element according to claim 5 wherein the heat sealing element is made from a single piece of metal having a thickness of from 0.13 to 0.6 mm.

7. A heat sealing element according to claim 2 or 3 or 4 wherein the heat sealing element is made from a piece of metal which has longitudinal sides and edges, and has a central longitudinal rib along one of said sides, said rib having a "bell curve" shaped cross-section.

8. A heat sealing element according to claim 2 wherein the heat sealing element is made from a flat strip of metal, bent so that the heat sealing element comprises two flat elongated fins adjoined by a segment of a tube, each lateral edge of said segment being adjoined to a lateral edge of one of the elongated fins.

9. A heat sealing element according to claim 8 wherein said fins are oriented such that planes coincident with each of said fins meet at an angle of from 170 to 145 degrees.

* * * * *